United States Patent [19]
Kubo

[11] 3,962,529
[45] June 8, 1976

[54] EVAPORATIVE COOLING POWER CABLE LINE

[75] Inventor: Hiroshi Kubo, Osaka, Japan

[73] Assignee: Sumitomo Electric Industries, Ltd., Osaka, Japan

[22] Filed: Mar. 8, 1974

[21] Appl. No.: 449,570

Related U.S. Application Data

[63] Continuation-in-part of Ser. No. 187,256, Oct. 7, 1971, abandoned.

[30] Foreign Application Priority Data

| Oct. 7, 1970 | Japan | 45-99805[U] |
| Nov. 26, 1970 | Japan | 45-104270 |
| May 1, 1971 | Japan | 46-29008 |

[52] U.S. Cl. ............................. 174/15 C; 165/105
[51] Int. Cl.² .................................................. H01B 7/34
[58] Field of Search ............. 174/15 C, 15 R, 16 R, 174/16 B, DIG. 6, 25 G, 99 B; 165/105

[56] References Cited
UNITED STATES PATENTS

| 2,216,010 | 9/1940 | Hobart | 174/28 |
| 2,499,736 | 3/1950 | Kleen | 165/105 UX |
| 3,404,730 | 10/1968 | Kurisu | 165/105 |
| 3,609,206 | 9/1971 | McConnell | 174/15 C |
| 3,609,991 | 10/1971 | Chu et al. | 174/15 R |
| 3,673,306 | 6/1972 | Kirkpatrick | 174/15 R |

FOREIGN PATENTS OR APPLICATIONS

| 1,168,223 | 10/1969 | United Kingdom | 174/25 G |
| 560,209 | 3/1944 | United Kingdom | 174/15 C |

Primary Examiner—Arthur T. Grimley
Attorney, Agent, or Firm—Sughrue, Rothwell, Mion, Zinn & Macpeak

[57] ABSTRACT

An evaporative cooling power cable is provided with a circulating duct to act as a refrigerant passage. An insulating and liquescent cooling agent is sealed in the circulating duct to be liquified at least during part of its passage through the duct so that the liquid surface of the refrigerant is held higher than the inlet of the refrigerant to the cable. Thus, the refrigerant evaporated by the absorption of heat generated in the cable will naturally circulate the refrigerant to effectuate the cooling of the power cable.

16 Claims, 21 Drawing Figures

EVAPORATIVE COOLING POWER CABLE LINE

CROSS-REFERENCE TO RELATED APPLICATION

This application is a continuation-in-part of application Ser. No. 187,256, filed Oct. 7, 1971, and now abandoned.

BACKGROUND OF THE INVENTION

1. Field of the Invention

The present invention relates to an evaporative cooling power cable line capable of transmitting a large amount of electric current over a long distance.

2. Description of the Prior Art

The previous power cable lines have incorporated cooling systems generally by supplying various fluids, such as air, inert gas, water, insulating oil, etc. This cooling fluid is generally introduced into the interior or exterior of the cable under the effect of a force generating means, such as a fan or pump that sometimes utilizes the specific heat or evaporative latent heat. It has been found that in these conventional systems it is impossible to transmit a large current in the order of 8000 to 12,000 amperes over a long distance of, for example, 10 to 20 km.

Since the conventional system have generally utilized a form of rotary equipment, such as a pump or fan, it is often necessary to service them and police them with periodic inspection with the accompanying costs. For this reason, a cooling system that utilizes rotary equipment can not generally be utilized if a completely automatic system is desired.

While a conventional system may be capable of providing sufficient cooling efficiency in order to transmit between 2000 and 4000 amperes of current, it has been found that it is difficult to permit the flow of a large amount of refrigerant owing to the restriction in the size of the cable. Since the amount of pressure drop that exists for forcibly flowing refrigerant to cool the cable is generally proportional to the cube of the length of the cable and to the fourth power of the transmitting current, the capacity for carrying electric current is generally lowered in a long distance transmission line. For this reason, it has been found difficult to transmit a great deal of electric current such as 5,000,000 to 10,000,000 KVA which represents approximately 12,000 amperes at 500 KV cable line over a distance, for example, of 10 km.

It has been suggested to effectuate such a large power transmission over a long cable length that the cooling system be divided up in several sections of cable line, with rotary equipment and a cooler provided in each respective section. This, however, just further increases the cost and the reliance upon rotary equipment.

It has also been suggested that the amount of flowing refrigerant be lessened to reduce the pressure drop and that a cooler be provided adjacent the cable in such a manner that the refrigerant is taken out of the cable to be cooled and then is reintroduced into the interior of the cable insulating layer. However, generally the flowing speed of the refrigerant is small and the heat resistance of the boundary film between the refrigerant and the conductor becomes generally large so that the transmission of large current still remains difficult.

Generally, utilizing a forced cooling system, it has been found that only those systems that introduce the liquid refrigerant into the interior of the cable insulating layer or internal cooling system are capable of transmitting large amounts of current. The dependency upon rotary equipment, however, makes this system prone to failure. For example, if the rotary equipment is stopped, the cable temperature will increase in a relatively short time, causing a breakdown. In addition, if the current must be transmitted over a long distance, a forced cooling system must overcome a large pressure differential and, correspondingly, the rotary equipment, such as a pump, must be of large capacity and the cable also must be reinforced.

SUMMARY OF THE INVENTION

As a result of research into the natural circulation type of cable where an insulating and liquescent refrigerant is distributed into the circulating duct formed in a cable, it has been found that an automatic system can be effectuated. In addition, if natural air cooling unit is used as a cooling unit, a large current transmission cooling cable line can be provided without resorting to any external power supply. The circulating force is produced in the natural circulating type cable by the difference of heights of the liquid level of the liquefied refrigerant in the circulating duct in relation to the inlet and outlet for the refrigerant in the cable. The refrigerant will become gasified as it travels from the inlet to the outlet of the cable, since it will absorb heat from the flowing of the electric current through the cable. The refrigerant will be circulated naturally by the difference of the pressure based on the difference of the specific weight of the inlet of the refrigerant and the outlet of the refrigerant. The circulating pressure loss will be increased with respect to the density and flow rate (volume) of the fluid so that in winter the condensing temperature will be lowered with the result that the pressure in the circulating duct will also be lowered, whereby the density of the gasified refrigerant is lowered with the result that the circulating pressure will become larger than in summer. As a result, natural circulating amount of the refrigerant becomes less with the result that the cooling capacity is lower. Therefore, it has been found that it is necessary to design the system with wintertime conditions as the standard.

For example, when a partially or wholly halogenated hydrocarbon such as R-12 ($Cl_2F_2$) is used as a refrigerant, and if the atmospheric temperature in winter is −5°C., the condensing temperature will become, for example, 0°C — which is slightly higher than the atmospheric temperature due to the condensing heat. At this temperature, the pressure of the refrigerant becomes 3.1 $kg/cm^2$ (absolute pressure) and the density becomes 18 $kg/m^3$. On the other hand, if the atmospheric temperature in summer becomes 35°C, and the condensing temperature becomes 40°C., the condensing temperature will be the same as that in winter. The pressure of the refrigerant becomes 9.8 $kg/cm^2$ (absolute pressure) and the density becomes 55 $kg/m^3$. Thus, since the densities of the gasified hydrocarbon are different in winter and summer for the same amount of of gasified refrigerant, the circulating pressure loss in winter is larger than the circulating pressure loss in summer with the result that the natural circulating amount will become less and the cooling capacity therefore will be lowered. For example, the cable line for obtaining the current capacity of 3400 amperes in summer has been found as a result of experimental and theoretical studies to be reduced to 2100 amperes in winter.

As a result of the experiments, it was found that the evaporative cooling power cable line must be designed to meet the conditions of winter and that further if the cooling unit is air cooled, the cooling capacity of the cooling unit and, accordingly, the condensing temperature will vary depending upon the outer atmospheric conditions. If the cooling unit is water cooled, the cooling capacity varies depending upon the water temperature. Thus, when the condensing temperature varies depending upon the conditions of the external circumstances, there is no problem when the condensing temperature is increased, but the evaporating rate of the cable increases abruptly when the condensing temperature is decreased. This is the same effect as when the heat generating amount of the conductor is increased so that the circulating phenomenon is partially irregular with the result that a reverse flowing phenomenon can take place in the worst condition with the result that the cable temperature is tentatively increased. FIG. 8 shows the result of a transient increase of the cable temperature wherein the ordinate indicates the temperature (°C) of the cable and the abscissa indicates a time (minute); if the temperature of the cable is 40° C before the time is zero and the condensing temperature is abruptly decreased by 10°C at the time being zero, the temperature reaches 80°C of maximum allowable temperature for the cable in approximately 5 minutes and it reaches 100°C in approximately 8 minutes. Thereafter, the temperature becomes that corresponding to the abrupt decrease of the condensing temperature. In order to avoid such abnormal phenomenon, it has been found that it is necessary that the amount of electric current to be transmitted by a cable such as the one previously mentioned (the capacity of which in winter is 2100 amperes) is restricted to approximately 1900 amperes. In addition, it has also been found that the following troubles occur. That is, when the condensing temperature is lower than the atmospheric temperature and the colling unit is water cooled, or when the condensing temperature is lower than the atmospheric temperature such as in an underground manhole, cavity, or duct in winter and the cooling unit is air cooled, the heat will be transmitted from the exterior into the refrigerant tube that introduces the liquefied refrigerant into the cable and the refrigerant liquid within the refrigerant tube will be gasified due to this transmitted heat. Generally, since the refrigerant tube is of considerable length, almost the same length as that of the section of the cable cooled, the transmitted heat must be accounted for. Even if a heat insulating structure is utilized and the cable is essentially buried under the ground or is exposed to the atmosphere, it is difficult to prevent moisture from entering with the result that it is difficult to maintain heat insulating characteristics stably for long periods of time. If the heat is transmitted so that the cooling capacity of the cable it self is reduced, the specific weight of the refrigerant within the refrigerant tube will be lowered by the foams of the descending portion of the refrigerant tube with the result that the refrigerant circulating force itself will be lowered so that it will become difficult to cope with the heat generated by the large amount of electric current. Such phenomenon becomes troublesome not only in case of a great deal of current, but also with only a small amount of current. That is, if such foams have taken place, even when the electric current is small, the foams are easily accumulated so that, since the refrigerant circulating force is essentially small, the foams can even introduce a reverse flow phenomenon. Accordingly, it has been found that the generation of the foams in the refrigerant tube should be avoided.

The present invention eliminates the aforementioned disadvantages of the conventional power transmission cable line and provides a cable line which can transmit a large amount of electric current over a long distance.

It is another object of this invention to provide an evaporative cooling power cable line which may stably transmit a great deal of electric current regardless of the season so as not to exceed the maximum allowable temperature of the cable even for abrupt variations of the external conditions.

In order to perform the aforementioned objects of this invention, a liquescent and insulating refrigerant is utilized as a cooling medium, and the interior of the power cable is cooled by utilizing the evaporative latent heat of the refrigerant with a natural circulating action based on the heat generation of the cable. That is, at first, since the liquescent gas is generally very low in viscosity, a great deal of refrigerant is relatively easily circulated by the slight circulating force. In addition, a relatively strong circulating force is obtained readily by the evaporation of the liquescent gas without using a pump as will be hereinafter described. Also, the heat resistance of the boundary film will become small due to the low viscosity.

In the evaporative cooling power cable line of this invention, a metal tube directly contacting with the conductor is used as the refrigerant circulating path in the interior of the cable, and the refrigerant itself is directly contacted with the metal tube or with the hollow conductor itself being used as the refrigerant path so that the heat generated in the conductor is transmitted to the refrigerant almost without any temperature difference.

The evaporative cooling power cable line of this invention may include the entire power energy transmission line.

According to the invention, there is provided an evaporative cooling power cable line which includes a circulating line formed by a cable and refrigerant passage with an insulating and liquescent cooling medium sealed in the circulating line to be liquefied at least in part of the refrigerant passage so that the liquid surface of the refrigerant is held higher than the inlet of the refrigerant of the cable so as to evaporate the refrigerant by the heat generated at the cable and to naturally circulate the refrigerant to cool the cable. A pipe is connected from the connection of one cable to a refrigerant liquid receiver and from the refrigerant liquid receiver to the other cable connection to form a closed refrigerant passage. A pipe can be connected from the upper portion of the pot head to the liquid receiver and the liquid receiver can be connected to the cable connection to form the refrigerant passage. A pressure sensitive control device can be provided in the cooling medium liquid receiver so that the pressure in the cooling medium circulating passage is maintained at a predetermined value.

BRIEF DESCRIPTION OF THE DRAWINGS

These and other objects, features and advantages of this invention will become apparent from the following description taken in conjunction with the accompanying drawings, in which:

FIG. 17 shows the cable at no load, with the cable and pipes being filled by the liquid phase coolant and no flow ocurring. FIG. 18 shows the cable during a transient full load, a rising two-phase flow having been generated in the feeding pipe. FIG. 19 shows the cable during a steady-state full load, a one-way flow having been generated in the feeding pipe, the cable, and the return pipe. FIG. 20 shows the effect on the cable during a transient full laod of making the return pipe and the feeding pipe the same length — namely, a rising two-phase flow is generated in both the feeding pipe and the return pipe.

DESCRIPTION OF THE PREFERRED EMBODIMENT

Figure 1:
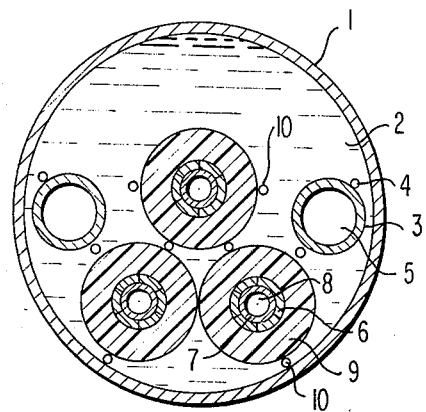
FIGS. 1 to 3 are sectional views of power cables that can be used in the invention.
Figure 2:
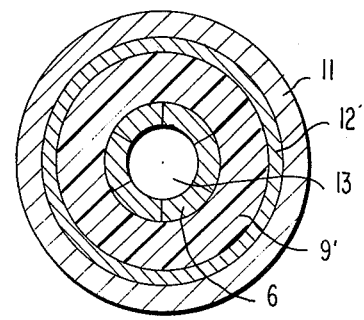
Figure 3:
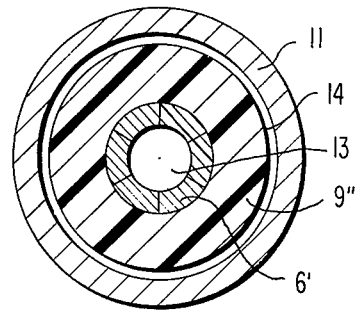

Reference is now made to the drawings, particularly to FIGS. 1 to 3, which show some examples of the cable used in the power cable line of this invention. This may be any of pressure type cable, such as, for example, pipe-type cable and self-contained type cable, gas insulated cable or solid insulating cable such as, for example, oil-impregnated solid type and cross-linked polyethylene insulating type and plastic insulating type cable. The cooling medium may be of insulating type, and may be of separate type so that the insulating layer and the cooling medium may be separated from each other, or may be of a type permitting contact with each other, or of the type so that the cooling medium itself is acted as an insulating pressure medium. In any case, it is necessary that the refrigerant be in contact directly with the conductor or with the metal tube contacting directly with the conductor so that the heat generated at the conductor is easily picked up by the refrigerant.

FIG. 1 shows a sectional view of the pipe type cable, and shows a form where the insulating pressure medium and the cooling medium are separated. In FIG. 1, reference numeral 1 is a steel pipe, 2 insulating oil, 3 an aluminum tube forming a passage 5 for partially or wholly halogenated hydrocarbon refrigerant, and 4 is a skid wire provided on the outer surface of the tube 3. A tubular segmented conductor 6 is closely engaged on its inner peripheral wall with an aluminum tube 7 and on its outer peripheral wall with an insulating layer 9 (including an electric shield layer and mechanical protecting layer) composed of oil impregnated paper. A skid wire 10 is provided on the outer surface of the insulating layer 9, and the tube 7 forms a passage for the hydrocarbon gas. Members 3 to 5 constitute sheath cooling tubes, and members 6 to 10 constitute cable cores. The sheath cooling tube is provided when required if the sheath loss is large; if oil is not used, but refrigerant is used as an insulating pressure medium, this sheath cooling tube is unnecessary regardless of the sheath loss.

If the hydrocarbon gas or $SF_6$ is used as a refrigerant having liquescent and insulating properties, the evaporative latent heat of the gas may be effectively used to cool it, and (as will be hereinafter described) it becomes easy to introduce the refrigerant into the cable at the joint and end portion or to take out the refrigerant therefrom.

Further, if the refrigerant is non-conductive, in the case of the pressure type cable, the refrigerant itself may be used as insulating pressure medium. Particularly, the hydrocarbon R-12 has large evaporataive latent heat and is adapted for its pressure range.

FIG. 2 shows the self-contained type cable utilizing the cooling medium as insulating pressure medium, and FIG. 3 shows the solid insulating type cable without using the insulating medium. In the drawings, the same numerals are designated to the same parts and components, and numeral 11 illustrates an anticorrosive layer, 12 a metal sheath, 13 a hollow portion for providing a refrigerant passage. The insulating layer 9' in FIG. 2 is composed of insulating paper or plastic tape, and the insulating layer 9'' in FIG. 3 is composed of cross-linked polyethylene, and the conductor 6' is made of aluminum tube.

If the total length of the cable is very long, the cable can be divided into plural sections so that one cooling section is used with the refrigerant circulating path as shown in FIGS. 4 to 7, and several such sections are gathered to form one line. If the length of the cable is short, it is not necessary to divide the cable.

Figure 4:
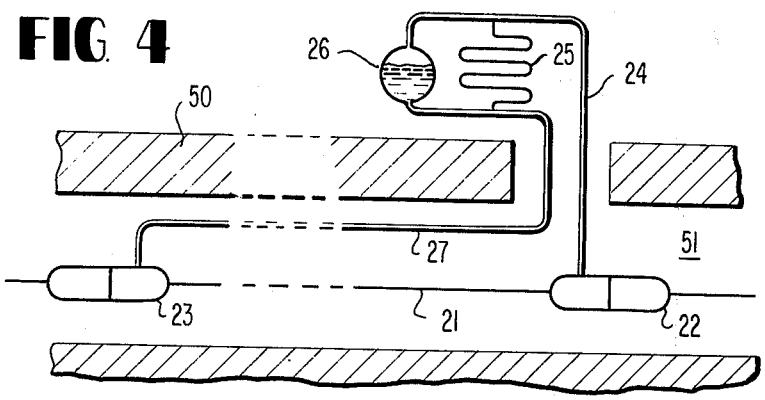
FIGS. 4 to 7 are schematic views of some examples of the cable lines of the invention.

Referring now to FIG. 4, which shows one example of the power cable line of this invention, numeral 21 is a cable horizontally buried in the cavity 51 under the ground surface 50. Joints 22 and 23 are provided at both ends of one section of the cable 21, 24 and 27 are refrigerant tubes wherein the former is the gas side, while the latter is the liquid side. 25 is a condenser, 26 is a refrigerant liquid reservoir provided on the ground to be naturally cooled. It may, of course, be forced air cooled or water cooled. The cable 21 may be directly buried or may be provided under water or on the ground. The refrigerant reservoir 26 absorbs the expansion and contraction of the refrigerant based on the temperature change to be provided so that the liquid level of the refrigerant is generally at a predetermined level.

Figure 17:
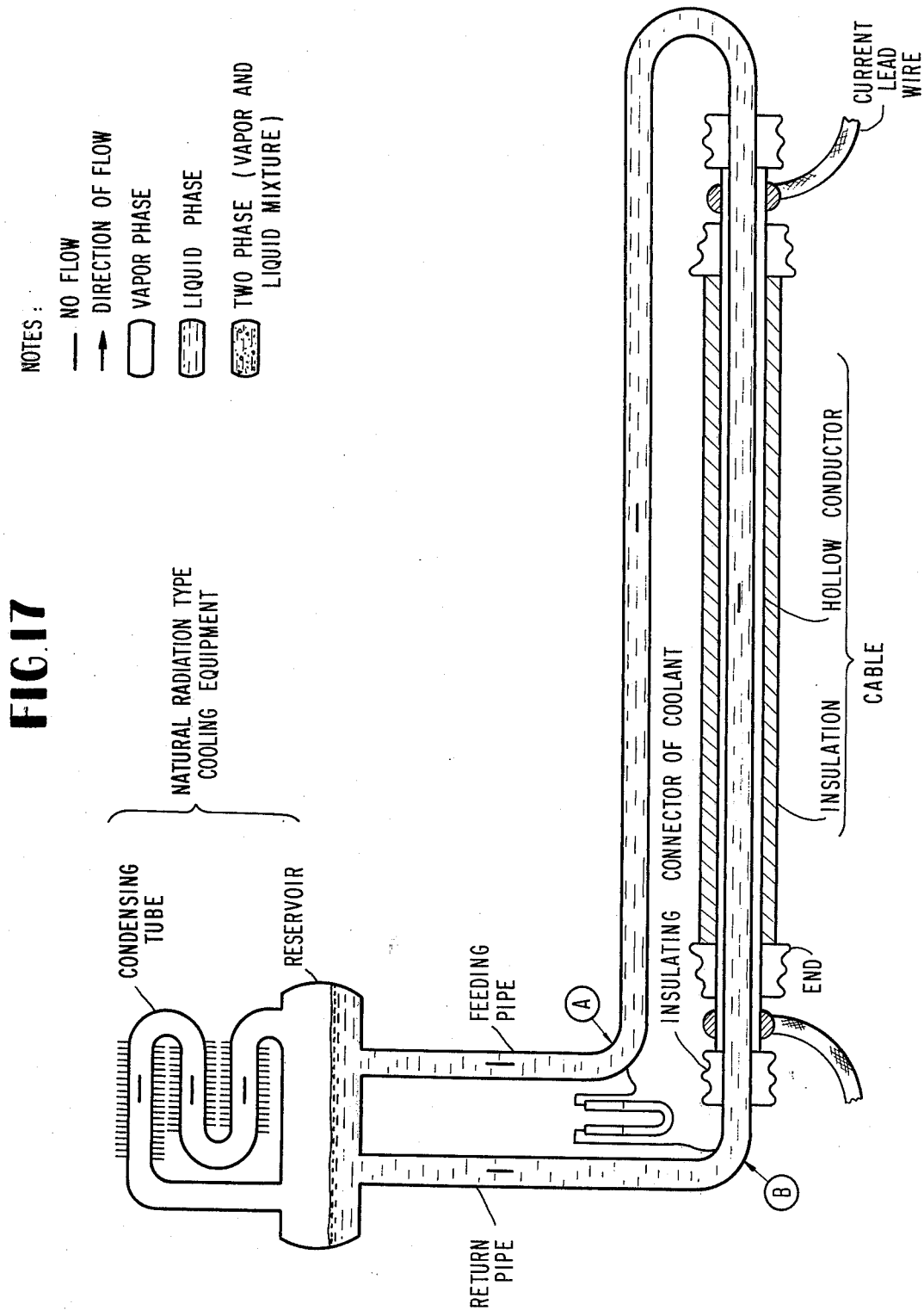
FIGS. 17–20 are explanatory diagrams for use in explaining the natural circulation in power cables according to the present invention.
Figure 18:
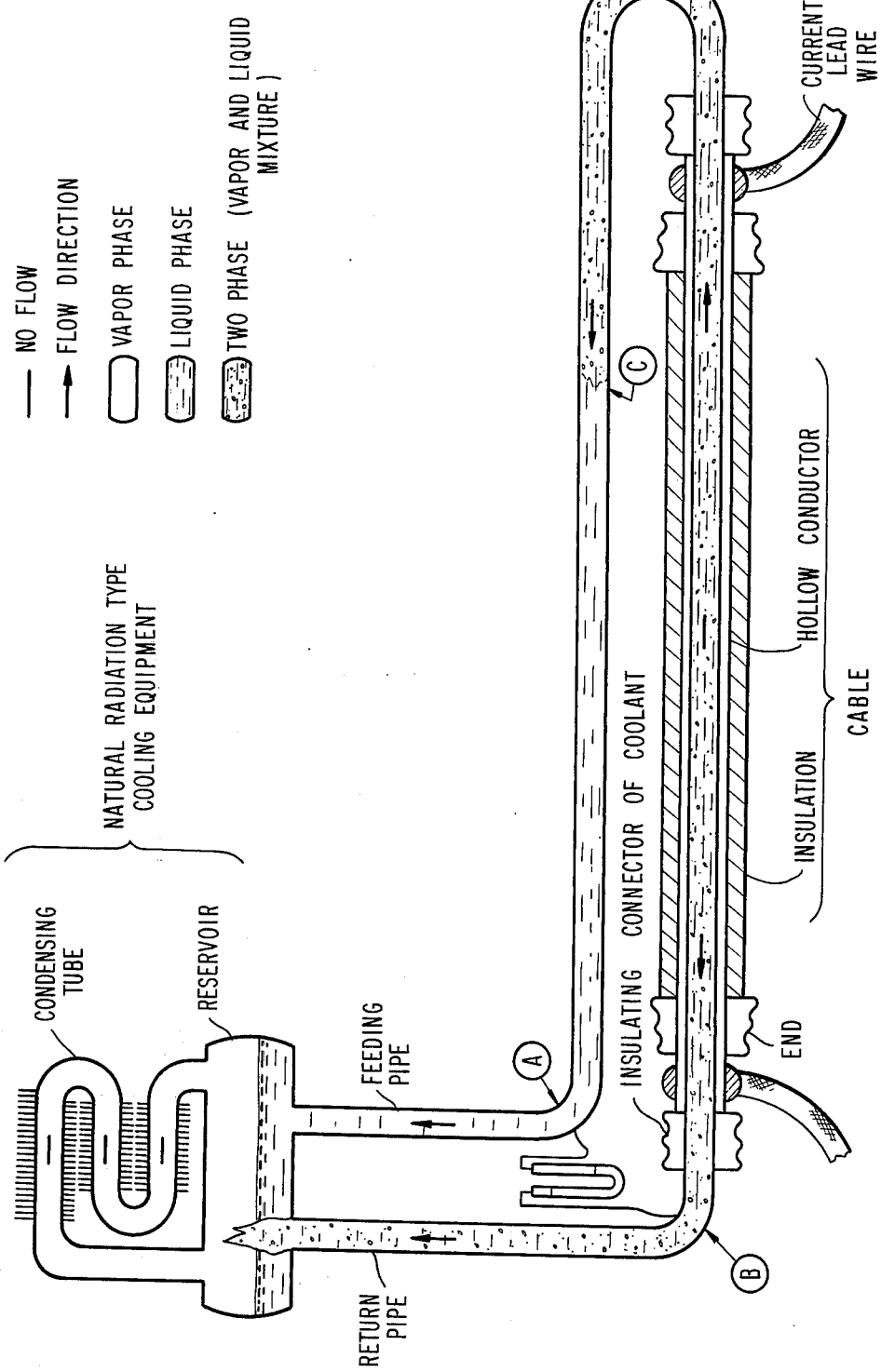
Figure 19:
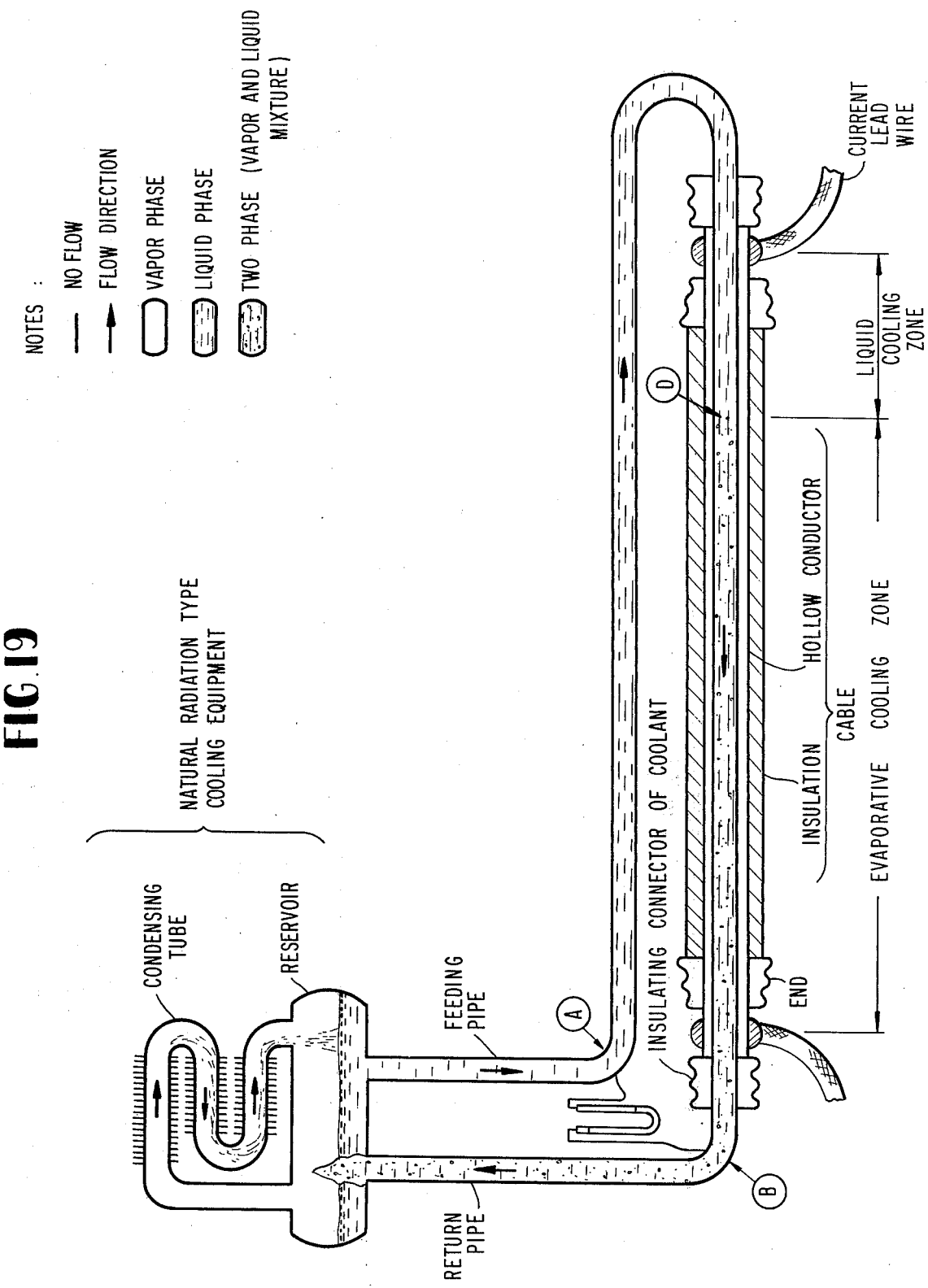

This cable line is operated as follows: after the proper amount of refrigerant is placed in the refrigerant circulating path, it is sealed. Thereafter, when a heat is not being generated in the interior of the cable, the refrigerant is stationary so that the interior of the cable is all filled with the liquid refrigerant. This situation is additionally illustrated in FIG. 17. If heat is generated in the cable so that the temperature of the cable is increased, the refrigerant is evaporated in the cable so that the volume thereof is expanded with the result that the evaporated refrigerant is initially moved from both the joints 22 and 23 through both the refrigerant tubes 24 and 27 upward to the condenser 25 and refrigerant reservoir 26 disposed on the uppermost portion. This situation is additionally illustrated in FIG. 18. However, the distance to the condenser 25 is long and the resistance on the way thereof is large at the joint 23 side, while the distance is short at the joint 22 side. Accordingly, the refrigerant is biased towards the joint 22 side. Therefore, more gasified refrigerant flows out from the joint 22 side, whereby the gas phase becomes gradually greater in the refrigerant tube 24 so that the pressure increase based on the difference of the heads in the refrigerant tube 24 becomes smaller than the pressure increase based on the difference of the head in the refrigerant tube 27. That is, there takes place a pressure difference between the joints 22 and 23 so that the refrigerant starts to flow from the joint 23 to the joint 22 in the cable 21 in the mixed state of gas and liquid, and at steady-state the system flow becomes one-way in that direction. This situation is additionally illustrated in FIG. 19. It is possible to provide a check valve in the refrigerant tube 27 so as to forcefully unify the direction of the flow of the refrigerant, but in this event, it is necessary that the check valve does not resist against the forward flow of the refrigerant.

Figure 20:
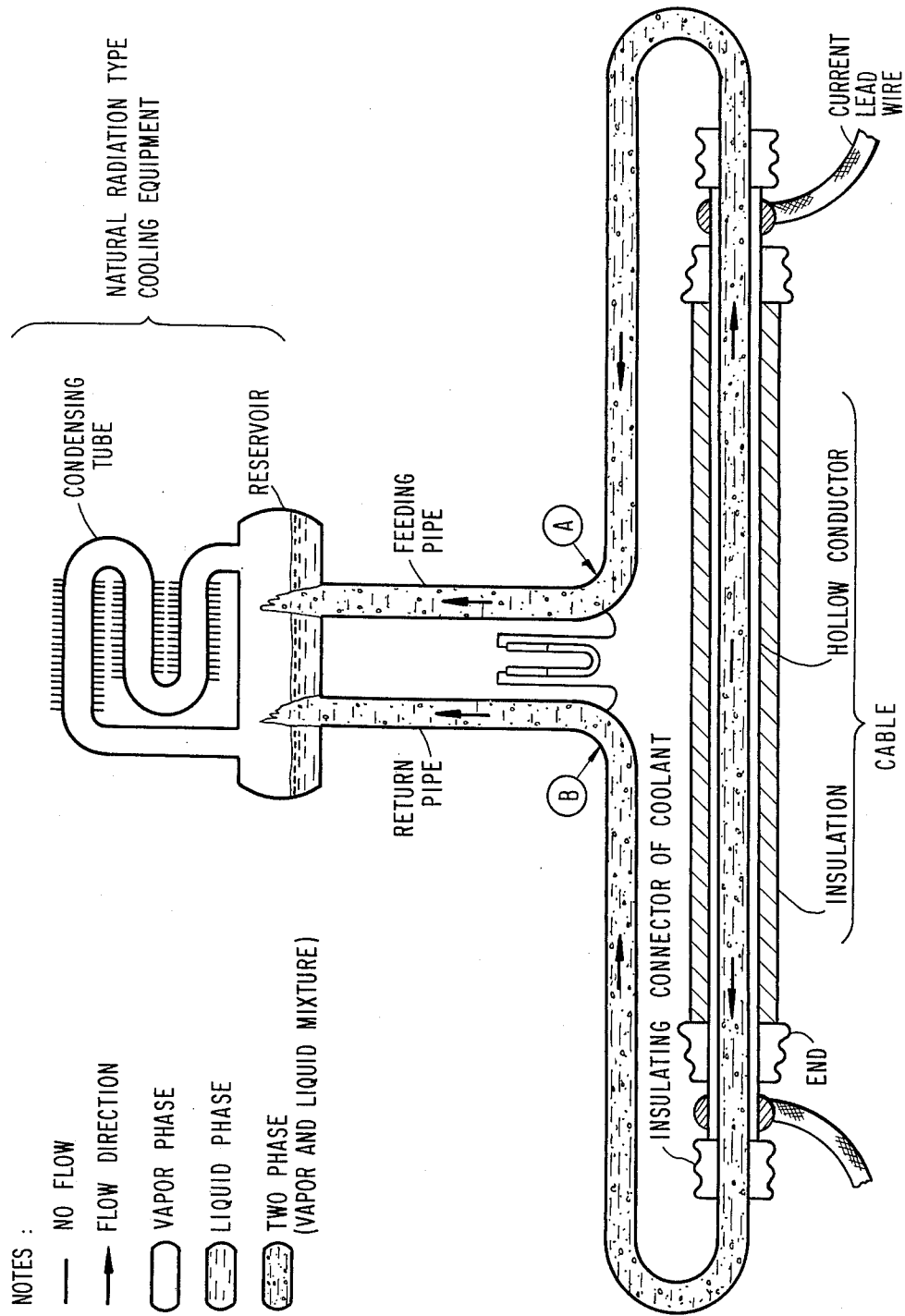

In contrast to the invention, the situation which would be presented if tubes 24 and 27 were made the same length is illustrated in FIG. 20. As shown therein, a random oscillatory flow is generated which obviously is of little use in cooling the cable.

Figure 21:
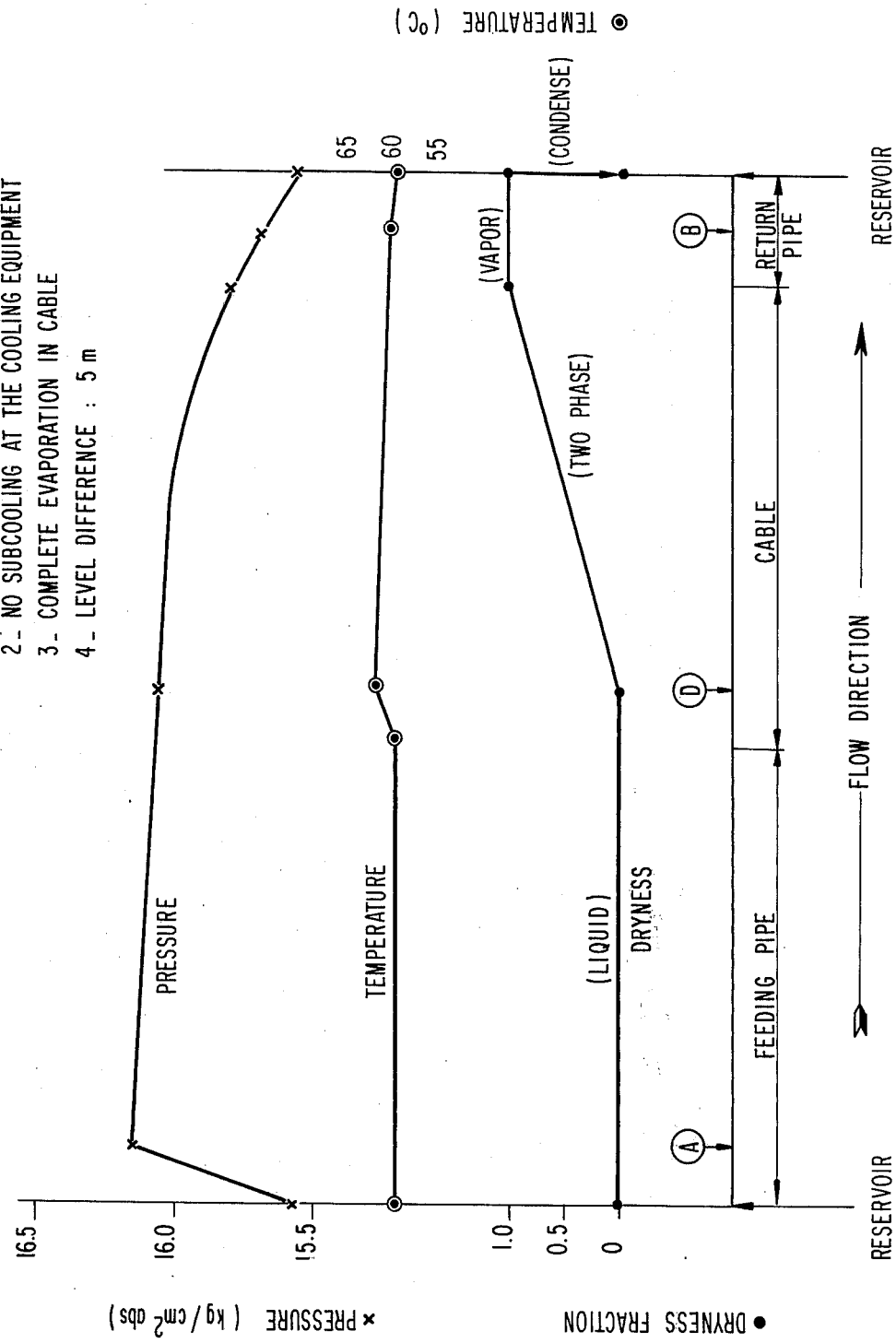
FIG. 21 shows typical distributions of pressure, temperature, and dryness in a power cable according to the invention during a steady-state full load.

As a result of the theoretical and experimental studies, it is known that the pressure difference generated between joints 22 and 23 can be made to correspond to over 50 percent of the pressure increase based on the difference of the head between the liquid reservoir and the joints and the specific weight of the refrigerant liquid used. Thus, a considerable refrigerant circulating force can be created. Accordingly, if it is allowable, it is preferred that the cable 21 is buried deeply under ground, or the condenser 25 and refrigerant reservoir 26 are disposed high above the ground. However, even if the difference of the head is 2 to 3m, it has been found that sufficient circulating force is obtained. For example, if the cable line has a difference of the head of 2m and carries 8000 to 12,000 amperes, a circulating force sufficient to cool the cable with a length of 100 to 200m is obtained. Typical figures for pressure, temperature and dryness for a pipe according to the invention are additionally illustrated in FIG. 21.

The condenser 25 and the liquid reservoir 26 may be in series or in parallel, as shown in FIG. 4. Since the circulating force is weakened if the cooling action takes place in the refrigerant tube 24, heat retaining means may be provided if required so as not to lessen the cooling action.

The condenser 25 and the liquid reservoir 26 need not always be provided near the joint 22, but if they are properly designed for the diameter of the refrigerant tube 24 from the heat retaining viewpoint, they may be provided at points considerably apart from the joint 22 with the result that the restricting conditions on the design are less. The liquid reservoir 26 is not always necessary if the filling amount of the refrigerant is proper and the leakage of the refrigerant is extremely low. If omitted, the filling amount of the refrigerant must be designed so that the liquid level reaches proper position at the maximum temperature of the cable.

In summary of the foregoing description, it is necessary in the power cable line of this invention in order to cause the refrigerant to circulate naturally that the joint 23 be disposed below the liquid level of the refrigerant at the inlet of the cable.

Figure 5:
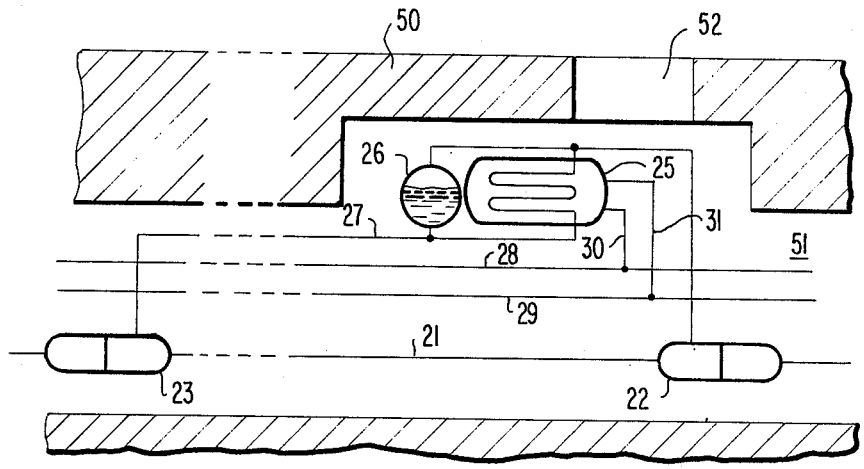

FIG. 5 shows an example of the invention where the condenser cannot be located on the ground owing to the difficulty of obtaining space in, for example, the cities. In this case, the condenser 25 is disposed in the manhole 52 which is cooled by the cooling water flowing the cooling water tubes 28 and 29 provided along the cable 21. The operation is the same as that shown in FIG. 4. Numerals 30 and 31 show branch cooling water tubes connected to the cooling water tubes 28 and 29. In this case, it is necessary to provide a cooling water circulating pump at the terminals of the cable line such as, for example, a power plant or a power substation, but is is not necessary to provide it along the cable line.

Figure 6:
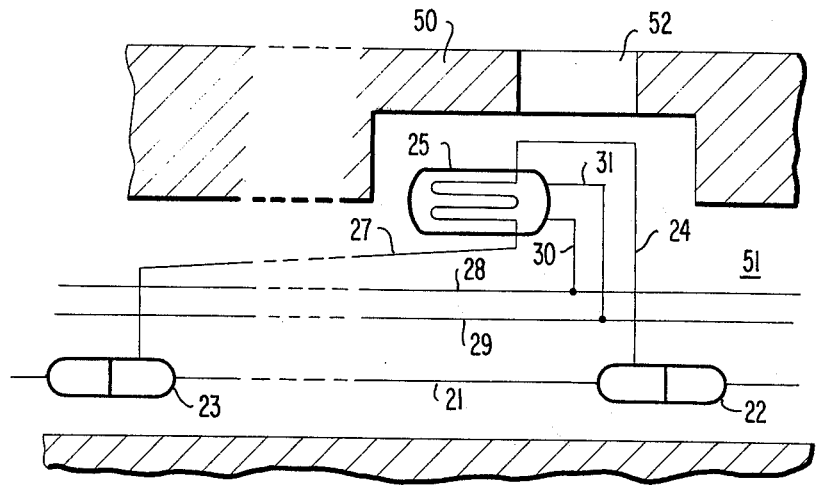

FIG. 6 shows an example of the invention where the volume of the refrigerant tube 27 in FIG. 5 is large enough to permit the omission of the liquid reservoir 26. In this embodiment, the refrigerant tube 27 is slightly inclined.

Figure 7:
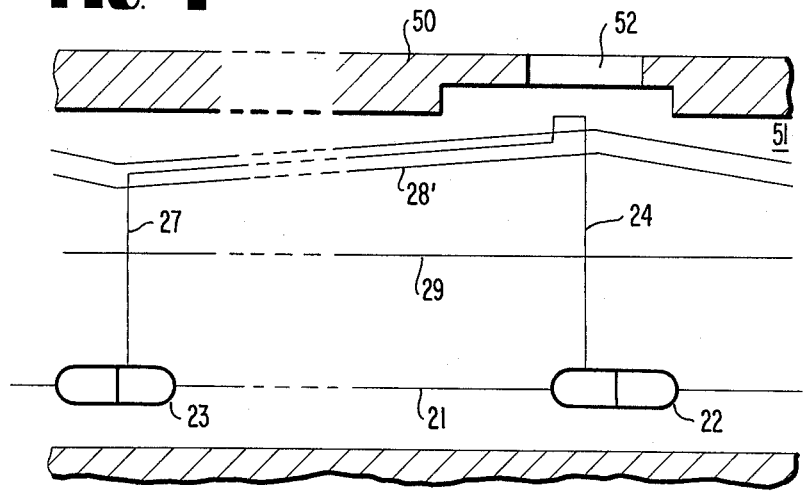

FIG. 7 is an example of the invention where the refrigerant tube 27 is contained in the cooling water tube 28' so that the refrigerant tube 27 may act as the liquid receiver and condenser.

In general, water is superior as the cooling medium, but it is electrically conductive and accordingly, is not proper for cooling the interior of the insulating layer of the cable, but as in the previous example, if the insulating and liquescent gas is used as a refrigerant which is cooled by water, it may be water cooled through the gas. In addition, as the condensation is incorporated with this heat exchange, the efficiency increases. Though this cooling water is not shown in FIGS. 5 to 7, if a cooling tower is provided so to cool the cable and the wasted amount is supplied to be circulated, the cable is cooled far more economically than if it were cooled by other insulating liquids.

As is clear from the description with reference to FIGS. 4 to 7, the condenser 25 and the refrigerant liquid reservoir 26 are not always necessary. In the embodiment shown in FIG. 4, these may be replaced by other equipment, such as is shown in FIGS. 6 and 7. All that is really necessary is that the liquid level in the refrigerant circulating path be always kept higher than the inlet of the refrigerant of the cable, whereby it is possible to naturally circulate the refrigerant in accordance with the foregoing description. Accordingly, if the refrigerant tubes 24 and 27 satisfy the aforementioned conditions, the position thereof with respect to the cable may be any position.

If the total length of the cable is short, or includes a rising portion of the cable, the refrigerant liquid reservoir is so provided that the liquid level of the refrigerant is higher than the rising portion of the cable in such a manner that one rising portion and the other rising portion are communicated with the refrigerant liquid reservoir by the refrigerant tube. In this case, it is preferable that the inlet of the refrigerant of the cable be lower than the liquid level, but even it the outlet side thereof is disposed higher than the liquid surface thereof, the natural circulation of the refrigerant is not lost. The refrigerant tube may be connected to the cable so as to constitute the refrigerant passage.

It should be understood from the foregoing description that, since the power cable line of this invention does not use rotary equipment for circulating the refrigerant, its servicing is very easy and may be provided without any operator. In the embodiment shown in FIGS. 5 to 7, the time for taking emergency action in case of the stoppage of the pump may be lengthened by the provision of the water accumulating tank. Particularly in the embodiment shown in FIG. 7, since it takes a long time to increase the temperature of the water, even if the tank is not provided, the time for repairing may be sufficient. Since the cooling system is of the internal cooling type, the cooling efficiency thereof is large so that the capacity of the transmission of the current may be increased. Further, since it uses insulating refrigerant, the division of the cooling sections of the cable may be easy so that when long distance power cable line is divided into many sections, as shown by the embodiment in FIG. 4, the division causes no trouble. In the embodiments shown in FIGS. 5 to 7, the dimensional limitations of the cooling water tube is less, and since water is small in viscosity and may be fed easily for long distance, there exist few troubles. Accordingly, many cooling sections are connected so as to readily transmit a great deal of electric current for long distance. For example, using a cable having a resistance of 10 microohms/m (corresponding to 2000mm$^2$ of copper) as the cable of the conventional configuration in size, it is possible to transmit a large amount of electric current such as 8000 to 12,000 amperes through the cable of this invention, and the power transmissions of 10km may be easily faciliated with the length of the manufacture and delivery of unit length of 100 to 200m as one cooling section.

Figure 9:
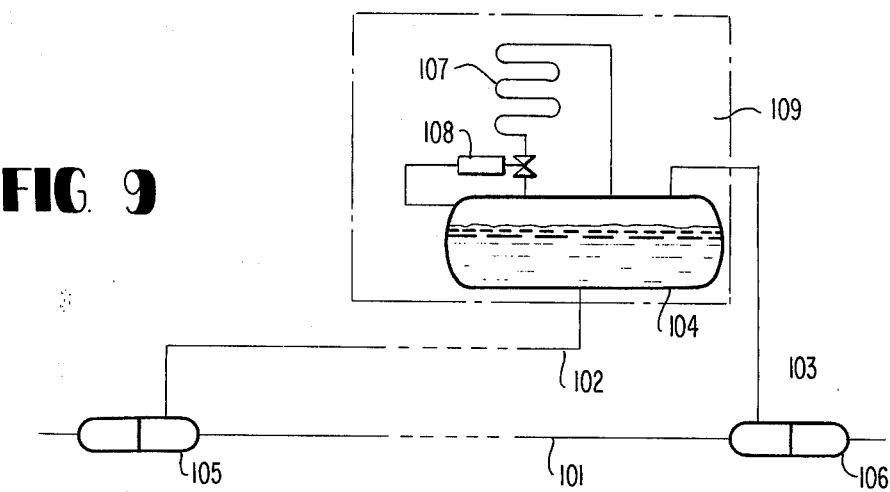
FIGS. 9 to 14 are explanatory views of several embodiments of the power cable lines of the invention.

Reference is now made to FIG. 9, which shows still another embodiment of the power cable line of this invention.

The refrigerant circulating path is formed by a cable 101, refrigerant tubes 102 and 103, and cooling unit 109, and it is filled with a refrigerant consisting of an insulating and liquescent gas such as a partially or wholly halogenated hydrocarbon. 105 and 106 illustrate joints of the cable, and the joint 105 is the inlet of the refrigerant of the cable 101, and the joint 106 is the outlet of the refrigerant of the cable 101. The cooling unit 109 is composed of a liquid reservoir 104, condenser 107, and pressure responsive valve 108 with pressure sensitive control means. The pressure responsive valve 108 detects the gas pressure in the liquid reservoir 104 and acts to open or close in such a manner that the relationship between the gas pressure in kg/cm$^2$ (absolute pressure) and the opening and closing of the valve is, for example, so set that the valve may open at 20 kg/cm$^2$. The liquid reservoir 104 maintains the liquid level of the refrigerant higher than the inlet of the refrigerant of the cable 101, but need not always be of this shape, and may be utilized with the connection of the refrigerant tubes 102 and 103. If hydrocarbon R-12 is in the refrigerant circulating path as a refrigerant, the saturated vapor pressure of absolute pressure of 20 kg/cm$^2$ corresponds to the temperature of 70° to 75°C. If the pressure responsive valve 103 is so set as to open at the pressure of 20 kg/cm$^2$, when an electric current is flowing through the cable 101, the pressure responsive valve 108 is closed, the condenser 107 does not function, and the refrigerant in the cable 101 is not gasified, with the result that the refrigerant is stationary.

Figure 8:
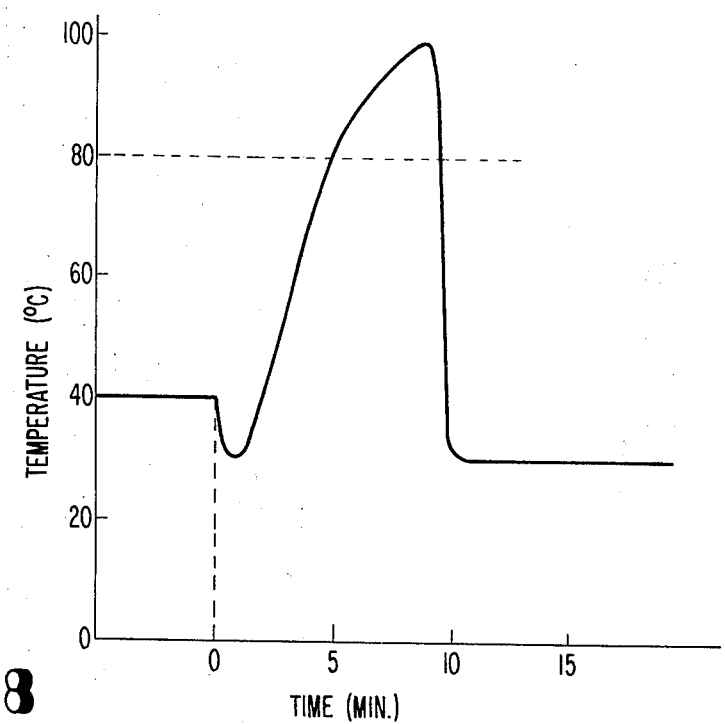
FIG. 8 is a graph showing temperature time changes of a power cable line.

If the heat capacity of the cooling unit 109 is made smaller than that of the cable 101, when the cable is energized, the refrigerant starts to circulate naturally due to the difference of the pressure based on the difference of the specific weight of the inlet and outlet of the refrigerant as aforementioned, to act as a cooling effect on the cable 101 so that the temperature of the liquid reservoir 104 increases together with the temperatures of the cable. With hydrocarbon R-12 as a refrigerant, and assuming that the operating temperature of the cable 101 is below 80°C., when the cable temperature reaches 75°C., the pressure of the liquid reservoir 104 is correspondingly increased so that the pressure responsive valve 108 is fully opened with the result that the condenser 107 operates to effect its cooling capacity. Accordingly, the cable temperatue is restricted generally to 75°C. If abrupt temperature change, such as may be caused, for example, by a sudden shower after sunshine in summer, occurs, then the pressure starts to lower, the pressure responsive valve 8 is closed so as to prevent an abnormal phenomenon from taking place as shown in FIG. 8. When the refrigerant circulating amount would otherwise be reduced due to the atmopsheric temperature drop in winter, it may be kept the same as that in summer by maintaining the pressure in the liquid reservoir 104 generally at 20 kg/cm$^2$ except in the case where the heat generation of the cable is zero.

Thus, in order to detect the temperature increase of the cable 101 at the cooling unit 109, the heat capacity of the cooling unit 109 must become smaller than that of the cable because, if the relationship is reversed, the time for the detection of the temperature change is delayed so that it cannot overcome the abrupt change of the electric current. Even if the pressure responsive valve 108 is fully opened, a slight heat dissipation takes place so that it is apprehended that the presssure in the circulating path is not sufficiently increased in cold winter, and accordingly it is considered that the liquid reservoir 104 is so constructed as to insulate the heat to the outer atmosphere in order to rapidly lessen the condensing capacity of the pressure responsive valve upon full closure thereof. In the above embodiment, since the operating pressure of opening and closing of the valve is set higher than the steam pressure of the refrigerant corresponding to the maximum design temperature of the atmospheric temperature or underground temperature provided with the refrigerant tube 102 for introducing the liquefied refrigerant into the cable, when slight heat is generated in the cable 101, the temperature in the cable is increased so that the pressure in the refrigerant circulating system becomes high with the result that the evaporating phenomenon in the refrigerant tube 102 does not exist. In general, there takes place dielectric loss in addition to the conductance loss in the cable, and the dielectric loss takes place even if the transmitting power is zero so that the pressure over the refrigerant vapor pressure corresponding to the maximum temperature provided in the refrigerant tube 102 is sufficiently held. If the thermal insulation of the liquid reservoir 104 is insufficient, there sometimes take place a slight reversing flow phenomenon of the refrigerant, but if the operating pressure of the opening and closing of the valve is thus set, since the function of the condenser is cancelled, even if a great deal of current is suddenly carried, the pressure is raised for a short time so that the reversing phenomenon is rapidly stopped and the refrigerant circulating force is not lowered. However, if the operating pressure of the opening and closing of the valve does not satisfy the aforementioned conditions, the reversing phenomenon will not be stopped at times, and a stable cooling state is not obtained. The setting of the operating pressure becomes different depending upon the maximum environmental temperature of the refrigerant tube and the types of the refrigerant. However, if the maximum atmospheric temperature in summer is assumed tentatively to be 35°C., in the case of, for example, the hydrocarbon R-12, the operating pressure is set over 8.5 kg/cm$^2$, and in the case of the hydrocarbon R-22 (CHClF$_2$), it is set over 12.0 kg/cm$^2$. This pressure corresponds to the vapor pressure of those refrigerants at 35°C.

Figure 10:
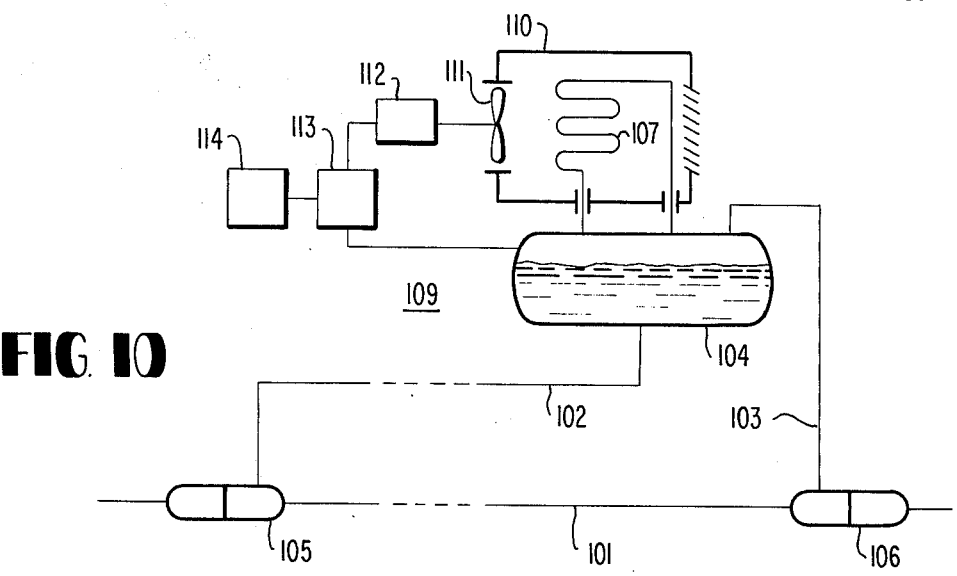

FIG. 10 is an explanatory view of an embodiment of the cable line of this invention wherein the same parts and components in the embodiment shown in FIG. 2 are designated by the same reference numerals. The previous embodiment had the natural air cooled cooling unit, but this embodiment has a forced air cooling unit 109. The condenser 107 is disposed in the case 110, and is forcibly air cooled by the fan 111, and the fan 111 is rotated by an electric motor 112. This motor 112 is rotated by any pressure higher than the set pressure sensed by the pressure responsive control unit 113. Reference numeral 114 is a power supply, and the power for controlling the voltage and frequency to be supplied from the power supply 114 to the motor 112 or the rotating speed of the motor 112 is controlled by the pressure responsive control unit 113 for detecting the pressure of the liquid reservoir 104. For example, if the set pressure of the pressure responsive control unit is 19 kg/cm$^2$, when the temperature of the cable 101 is increased over 70°C., the pressure of the liquid reservoir 104 raises over 19 kg/cm$^2$ accordingly so that the motor 112 starts to rotate with the result that the condensing capacity of the condenser 107 is increased. As to the heat capacity of the cooling unit 109, it is the same as that used in the previous embodiment, and it may act in the same manner against any abrupt change of the atmospheric conditions.

Figure 11:
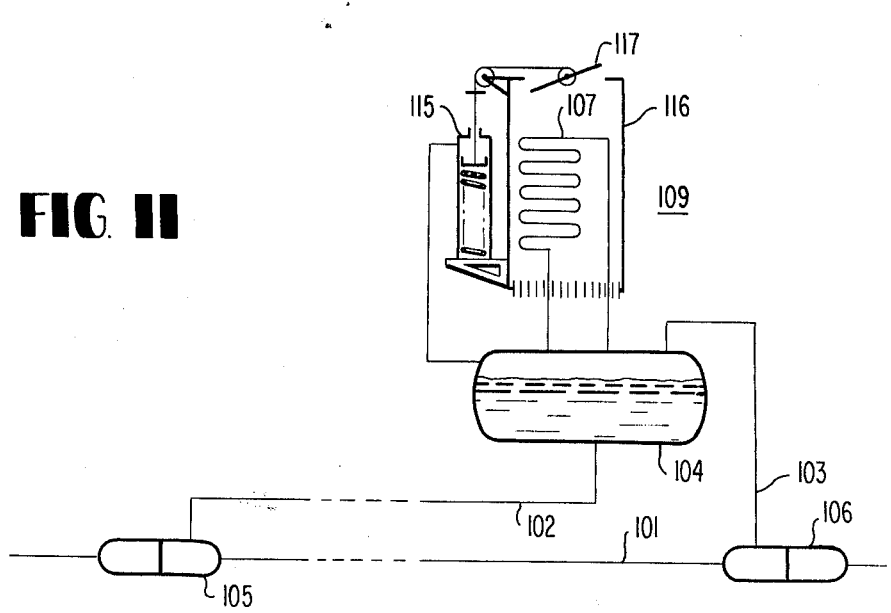

FIG. 11 shows still another embodiment of the power cable line of this invention. In this embodiment, the natural air cooled cooling unit 109 is controlled by opening and closing of a damper 117. The condenser 107 is disposed in the case 116, the damper 117 is spring biased in such a manner that the damper 117 is opened or closed by the piston 115 operating by the pressure of the liquid reservoir 104. If the temperature of the cable 101 is increased so that the pressure is increased to reach a predetermined pressure, this damper 117 starts to open so that the natural circulating air amount is increased by the chimney action of the case 116 with the result that the condensing capacity thereof is increased. The damper 117 must be designed so that it is completely opened by the maximum pressure of the liquid reservoir 104.

Figure 12:
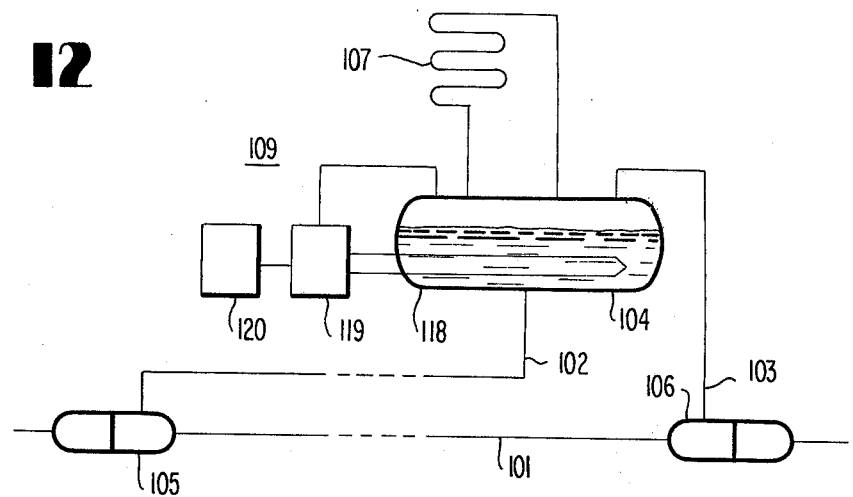

FIG. 12 shows still another embodiment of the power cable line of this invention. In this embodiment, the condenser 107 is naturally air cooled and is not particularly controlled, but the pressure of the liquid reservoir 104 is controlled by the heating of the heater 118 provided therein. The heater 118 is supplied with power from the power supply 120 through the pressure responsive voltage control unit 119, and when the temperature of the cable 101 is increased so that the pressure is increased, the heating power of the heater 118 is reduced.

Figure 13:
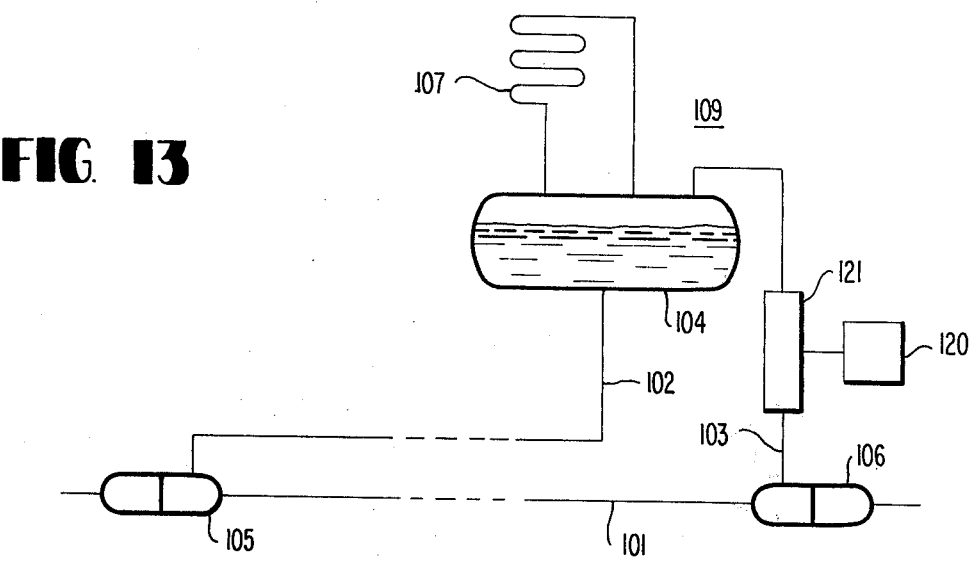

FIG. 13 shows still another embodiment of the cable line of this invention. In this embodiment, a heating tube 121 is provided between the joint 106 of the cable 101 and the liquid reservoir 104. The heating tube 121 is supplied with heating power from the power supply 120. In comparsion with the embodiment shown in FIG. 12, in this embodiment, it is heated at the refrigerant tube 103 so that the refrigerant circulating force is strengthened at the same time the pressure is increased and a constant heat is applied always thereto.

Figure 14:
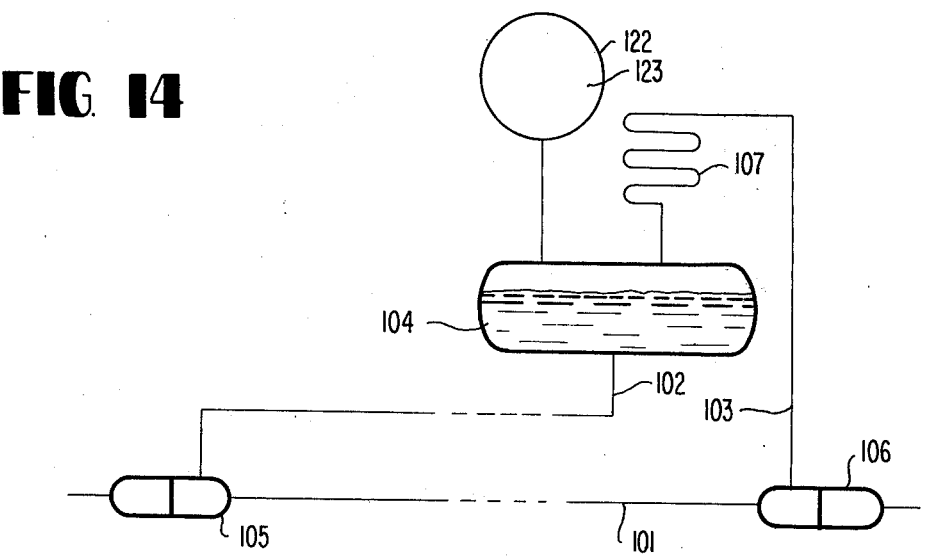

FIG. 14 shows still another embodiment of the cable line of this invention. In this embodiment, a tank 122 is provided on the upper portion of the liquid reservoir 104 so that gas 123 different from the liquescent gas used as refrigerant is filled therein. This gas 123 is selected so that it will not condense within the operating conditions. Since gas 123 is mixed naturally with the refrigerant to some degree, the performance of the condenser 107 is slightly reduced, but gas which is easy to be separated from the refrigerant rapidly in order to prevent this from happening to any large degree may be adopted. For example, when a heavy gas, such as a partially or wholly halogenated hydrocarbon is used as a refrigerant, N$_2$ gas, which is light and less expensive, can be used. In this case, since the pressure in the cable becomes the sum of the pressure of the gas 123 and refrigerant, if the filling pressure of the gas 123 is properly selected, the pressure in the cable is maintained over a predetermined value.

The embodiments shown in FIGS. 12 to 14 are adapted for the case where the change of the load current is abrupt and the heat capacity of the cable is small so that the heat generating amount per unit length is large, and if the previously described embodiments — such as, for example, the embodiments shown in FIGS. 9 to 11 — and either of the embodiments shown in FIGS. 12 or 13 are combined, there is provided a power cable line for transmitting a great deal of current. The cooling unit 109 may be of cooling type such as water cooled or oil cooled.

Figure 15:
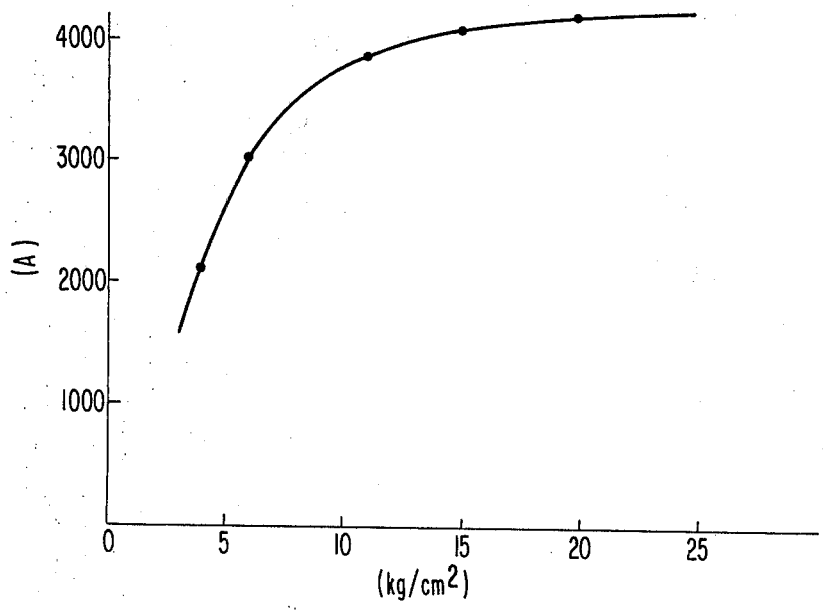
FIG. 15 is a graph showing the relationship between the pressure and the current that can be transmitted.

FIG. 15 shows a graph indicating the experimental data of the power transmittable current amperes of the embodiment of this invention which has a conductor of 2000mm$^2$ in sectional area with a total length of 25m and refrigerant path of 16mm of inner diameter filled with hydrocarbon R-12 as a refrigerant. In previous power cable lines, the upper limit of the current transmitting capacity was 2100 amperes in winter, but in this invention, the current transmitting capacity is 4200 amperes, which is twice the previous value. Without using the pump for circulating the refrigerant, particularly in the embodiment shown in FIGS. 9 and 10, since they do not need the external power supply, the servicing is superior when the cable is divided into several cooling sections for a long distance so as to transmit a great deal of current.

It should be understood from the foregoing description that, since the filling pressure of the refrigerant circulating system of the evaporative cooling power cable line of this invention is maintained over a predetermined value regardless of the change of the load current of the cable or the external conditions such as atmospheric temperature and water temperature, the conventional problems such as the pressure being reduced due to the low temperature in winter, the cooling capacity of the cable becoming insufficient due to the decrease of the circulating amount of the refrigerant, the cooling capacity being abruptly increased due to a rain shower after sunshine, and the reversing phenomenon that takes place with the evaporation of the refrigerant tubes 102, are all eliminated, and accordingly, the power transmitting capacity is greatly increased in a stable manner.

Even in a power cable line provided with a forced circulating unit, such as a blower or pump in the refrigerant tube, if they are stopped for any reason, the natural circulating system of this invention may be switched on manually or automatically so that the circulating capacity may be substantially within the scope of this invention.

Figure 16:
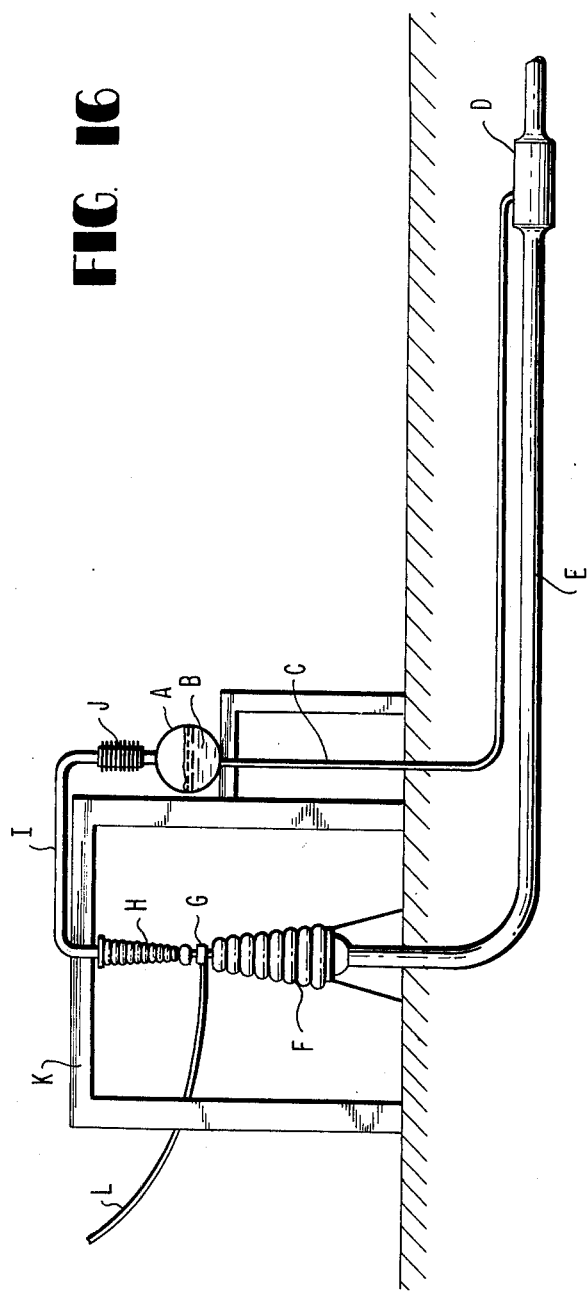
FIG. 16 is an explanatory schematic view of the forced cooling unit of the power cable used in this invention.

Referring to FIG. 16, which shows a cooling means used in the power cable line of this invention.

Reference character A illustrates a reservoir tank, containing liquid hydrocarbon B. The liquid hydrocarbon is supplied from the cable joint D through the pipe C into the cable E. The passage of hydrocarbon is properly provided in the cable E so that the heat generated in the cable is transmitted to the hydrocarbon. The cable may be of a single core of the three cores type. The hydrocarbon heated in the cable is evaporated. Accordingly, a fluid flow is generated at the rising portion of the pot head F of the cable. The hydrocarbon in the cable E moves from the joint portion D to the pot head F and has a very low viscosity which makes it easy to evaporate so that the heat absorption amount upon evaporation is very lage with the result that it is optimum for this purpose.

The evaporated hydrocarbon passes through the pot head F through the interior of the conductor drawing connecting tube G through the insulating cylinder H and through the piping I to the condenser J. The condenser J is of a natural air cooled type and the liquefied hydrocarbon is returned to the reservoir A. K shows a supporting iron frame, and L is an over head line.

When the power cable line is not energized, the cable is completely filled with the hydrocarbon liquid. For this reason, the reservoir A is disposed at the same height as the end of the pot head F.

Since the pot head is generally better in heat dissipation to the atmosphere than the cable portion, if the cooling of the pot head portion becomes somewhat insufficient, the reservoir A may be lowered. In this case, the circulating force is accordingly lowered so that the cable portion is not overheated.

If the cable is energized, the temperature is gradually increased so that refrigerant is evaporated with the result that the fluid flow naturally circulates the refrigerant to cool the cable.

A partially or wholly halogenated hydrocarbon can be used as a cooling medium with an actual pressure below 20 kg/cm$^2$G (over atmospheric pressure) at 35°C in summer so that a liquefied gas having large evaporating latent heat and very small viscosity is provided.

If this hydrocarbon is used, the following advantages are created:

1. Since it has small viscosity, even if the flowing speed is low, the heat transmission thereof in the cable is large so that the internal heat resistance is small with the result that the cooling effect is adequate.

2. Since hydrocarbon has small viscosity, the pressure loss due to the longitudinal flow will be small.

3. Since hydrocarbon is evaporated so that it becomes a mixture of gas and liquid, the specific weight becomes reduced so that the difference of the liquid specific weight in the feeding pipe becomes large, therefore, the pressure difference which creates the circulating force is increased.

4. The gas and liquid mixture at 60°C. to 80°C. is easily liquefied by natural cooling.

It should be understood from the foregoing description that the maximum cable temperature is restricted below 85°C. of the conductive temperature in case of 70 mm of inner diameter, 160 mm of outer diameter of the cable core, 400 mm of inner diameter of steel pipe, 70 mm of inner diameter of pipe for cooling the steel pipe using the cooling cable at both ends thereof of 500 KVA, 8 KVA and 400 m.

It should also be understood that since the power cable line of this invention does not use an electric motor for circulating the cooling refrigerant, the reliability of the cable for transmitting a great deal of current is not lowered, and periodic inspection and checking of the cable is not necessary with the result that the device may be operated without any operator.

The liquescent gaseous hydrocarbon can be any one of the following: $CCl_3F$, $CCl_2F_2$, $CClF_3$, $CBrF_3$, $CHCl_2F$, $CHClF_2$, $CHF_2$, $CCl_2F$—$CCl_2F$, $CCl_2$—$CClF_2$, $CClF_2$—$CClF_2$, $CBrF_2$—$CBrF_2$, $CClF_2$—$CF_3$, $CF_3$—$CF_3$ and $C_4F_8$.

What is claimed is:

1. An evaporative cooling power cable assembly comprising:
    1. an electrically conductive member adapted to carry large amounts of electricity and
    2. a closed loop cooling means including
        a. a cooling duct in thermal contact with said electrically conductive member along at least a portion of the length of said electrically conductive member, said cooling duct having an inlet and an outlet;
        b. a condenser;
        c. a first tube joining said condenser to the inlet of said cooling duct;
        d. a second tube, shorter than said first tube, joining said condenser to the outlet of said cooling duct; and
        e. a refrigerant cooling fluid having insulating and liquescent properties contained within said cooling duct and said first and second tubes, the surface of said refrigerant cooling fluid being disposed higher than the inlet of said cooling duct, whereby said refrigerant cooling fluid will absorb heat and change state from a liquid at the inlet of said cooling duct to a gas at the outlet of said cooling duct as it travels the length of said cooling duct in a unidirectional flow, thereby creating a natural circulation cycle without forced circulation caused by a pump or the like.

2. An evaporative cooling power cable assembly as claimed in claim 1 wherein said electrically conductive member surrounds said cooling duct.

3. An evaporative cooling power cable assembly as claimed in claim 1 and further comprising a pressure regulated valve and a pressure sensing means operatively connected to said pressure regulated valve to control the pressure regulated valve, said valve being disposed on an end of said condenser.

4. An evaporative cooling power cable assembly as claimed in claim 1 wherein said refrigerant cooling fluid is a halogenated hydrocarbon liquid.

5. An evapoarative cooling power cable assembly as claimed in claim 1 wherein said refrigerant cooling fluid is selected from the group consisting of $CCl_3F$, $CCl_2F_2$, $CClF_3$, $CBrF_3$, $CHCl_2F$, $CHClF\ 2$, $CHF_2$, $CCl_2F$—$CCl_2F$, $CCl_2$—$CClF_2$, $CClF_2$—$CClF_2$, $CBrF_2$—$CBrF_2$, $CClF_2$—$CF_3$, $CF_3$—$CF_3$, and $C_4F_8$.

6. An evaporative cooling power cable assembly as claimed in claim 1 and further comprising means for pressurizing said refrigerant cooling fluid and maintainint it at a minimum pressure level.

7. An evaporative cooling power cable assembly as claimed in claim 1 and further comprising a second fluid contained in said cooling duct, which second fluid is different from said refrigerant cooling fluid and is selected so that it will not condense within the operating conditions, but will remain a gas, whereby, since the gaseous pressure in said cooling duct is the sum of the gaseous pressure exerted by said second fluid and the gaseous pressure exerted by the fraction of said refrigerant cooling fluid which is in the gaseous state, the gaseous pressure in said cooling duct can be maintained over a predetermined value.

8. An evaporative cooling power cable assembly comprising:
1. an electrically conductive member adapted to carry large amounts of electricity;
2. a closed loop cooling means connected to the conductive member along at least a portion of its length and including:
   a. a cooling duct having an inlet and an outlet adjacent the conductive member,
   b. a condenser for cooling of cooling fluid to be recited hereinafter, said condenser being located in a case having an air inlet, but otherwise being air-tight,
   c. a spring-biased damper located in the inlet of said case and being capable of closing said inlet, and
   d. means for controlling said damper so as to control the air supplied to said condenser; and
3. a refrigerant cooling fluid having insulating and liquescent properties contained within said closed loop cooling means, said refrigerant cooling fluid being a liquid at the inlet end of said cooling duct but absorbing heat and changing state from a liquid to a gas as it travels the length of said conductive member, whereby a natural circulation cycle is created.

9. An evaporative cooling power cable assembly comprising:
1. an electrically conductive member adapted to carry large amounts of electricity;
2. a closed loop cooling means connected to the conductive member along at least a portion of its length and including:
   a. a cooling duct having an inlet and an outlet adjacent the conductive member,
   b. a condenser for cooling of cooling fluid to be recited hereinafter, said condenser being located in a case having an air inlet, but otherwise being air-tight,
   c. means for controlling the amount of air supplied to said condenser through said inlet; and
3. a refrigerant cooling fluid having insulating and liquescent properties contained within said closed loop cooling means, said refrigerant cooling fluid being a liquid at the inlet end of said cooling duct but absorbing heat and changing state from a liquid to a gas as it travels the length of said conductive member, whereby a natural circulation cycle is created.

10. An evaporative cooling power cable assembly comprising:
1. an electrically conductive member adapted to carry large amounts of electricity and
2. a closed loop cooling means including
   a. a cooling duct in thermal contact with said electrically conductive member along at least a portion of the length of said electrically conductive member, said cooling duct having an inlet and an outlet at the same height;
   b. a condenser;
   c. a first tube joining said condenser to the inlet of said cooling duct;
   d. a second tube, substantially shorter than said first tube, joining said condenser to the outlet of said cooling duct; and
   e. a refrigerant cooling fluid having insulating and liquescent properties contained within said cooling duct and said first and second tubes, the surface of said refrigerant cooling fluid being disposed higher than the inlet of said cooling duct, whereby said refrigerant cooling fluid will absorb heat and change state from a liquid at the inlet of said cooling duct to a gas at the outlet of said cooling duct as it travels the length of said cooling duct in a unidirectional flow, thereby creating a natural circulation cycle without forced circulation caused by a pump or the like.

11. An evaporative cooling power cable assembly as claimed in claim 10 wherein said electrically conductive member surrounds said cooling duct.

12. An evaporative cooling power cable assembly as claimed in claim 10 and further comprising a pressure regulated valve and a pressure sensing means operatively connected to said pressure regulated valve to control the pressure regulated valve, said valve being disposed on an end of said condenser.

13. An evaporative cooling power cable assembly as claimed in claim 10 wherein said refrigerant cooling fluid is a halogenated hydrocarbon liquid.

14. An evaporative cooling power cable assembly as claimed in claim 10 wherein said refrigerant cooling fluid is selected from the group consisting of $CCl_3F$, $CCl_2F_2$, $CClF_3$, $CBrF_3$, $CHCl_2F$, $CHClF_2$, $CHF_2$, $CCl_2F-CCl_2F$, $CCl_2-CClF_2$, $CClF_2-CClF_2$, $CBrF_2-CBrF_2$, $CClF_2-CF_3$, $CF_3-CF_3$, and $C_4F_8$.

15. An evaporative cooling cable assembly as claimed in claim 10 and further comprising means for pressurizing said refrigerant cooling fluid and maintaining it at a minimum pressure level.

16. An evaporative cooling power cable assembly as claimed in claim 10, and further comprising a second fluid contained in said cooling duct, which second fluid is different from said refrigerant cooling fluid and is selected so that it will not condense within the operating conditions, but will remain a gas, whereby, since the gaseous pressure in said cooling duct is the sum of the gaseous pressure exerted by said second fluid and the gaseous pressure exerted by the fraction of said refrigerant cooling fluid which is in the gaseous state, the gaseous pressure in said cooling duct can be maintained over a predetermined value.

* * * * *